UNITED STATES PATENT OFFICE.

MARSHALL H. KEYT, OF CHICAGO, ILLINOIS.

SEMISOLIDIFIED HYDROCARBON LIQUID AND METHOD OF PRODUCING AND UTILIZING THE SAME.

1,262,808.   Specification of Letters Patent.   Patented Apr. 16, 1918.

No Drawing.   Application filed February 4, 1916.   Serial No. 76,084.

*To all whom it may concern:*

Be it known that I, MARSHALL H. KEYT, a citizen of the United States of America, residing at Chicago, in the county of Cook and State of Illinois, have invented certain new and useful Improvements in Semisolidified Hydrocarbon Liquids and Methods of Producing and Utilizing the Same, of which the following is a specification.

It is the primary object of the invention to partially solidify inflammable hydrocarbon liquids to facilitate the safe handling and storage of the same, and to reconvert the substance into liquid form as required for use. As a specific instance, gasolene may be thus partially solidified, so that it will not readily escape from a leaky tank. Thus, it may be used in this form on aeroplanes and in other places where the escape of the liquid would be attended with great danger. On the other hand, it may be readily reconverted into liquid form as required for use in the engine, and will have lost no valuable property by the solidifying treatment.

Broadly considered, my invention comprises the employment as a solidifying agent of albumen or albuminous material. This is dissolved in a relatively large quantity of water, to which the gasolene or other petrolatum hydrocarbon liquid is added and thoroughly agitated. This will result in the formation of a semi-solid or jelly-like substance in which the hydrocarbon is retained while subject to not greater than atmospheric pressure. In case the liquid to be solidified contains any substance which would act to prematurely coagulate or precipitate the albumen, such for instance as alcohol, ether or other organic solvent, I modify the treatment by first adding to the water solution of the albumen a suitable quantity of anti-coagulating material, such as phosphoric acid. The liquid or liquids to be solidified are then added to the mixture, after which a quantity of alcohol may be added and the whole agitated as before described.

To re-liquefy the material, it is only necessary to subject the same to a somewhat greater than atmospheric pressure. This may be accomplished either by an increased atmospheric pressure or by a mechanical means, filtration or other equivalent treatment. For instance, the forcing of the substance through chamois skin will instantaneously reconvert the same into liquid form. On the other hand, if the pressure is not increased the substance will remain in solid form even where subjected to greatly increased temperature, and thus it is possible to burn the material as a solid.

It is obvious that my invention has a wide application, and may be used in connection with the solidification of many liquids not specifically mentioned, but in the present specification I shall confine the description to the solidification of gasolene. I shall also describe a specific process or treatment, it being understood that this may be varied without departing from the spirit of my invention.

A suitable quantity of albumen, such for instance as two and one-half pounds of the dried albumen, is dissolved in a suitable quantity of water,—from two to three gallons. To this may be added if desired a quantity of phosphoric acid, preferably three to four ounces. In such case I then dilute the solution with four or more gallons of hot water, after which is added the liquid to be solidified. Upon now adding one gallon of either ethyl or methyl alcohol the whole is converted into a jelly-like mass. I have found that this material is capable of absorbing a relatively large quantity of gasolene or other hydrocarbon liquid, so that from one to two per cent. by weight of egg albumen or of the dried albumen solution is all that is required for solidification.

The semi-solidified material may be handled with as great safety as any inflammable solid substance. It is non-explosive, and in case of ignition the flame is easily extinguished, and it burns only from the surface. Furthermore, as a rise in temperature does not liberate the liquid, it may be completely burned in solid form. However, for many uses, such as in an explosion engine, it is desirable to re-convert the substance into a liquid, which may be readily accomplished by a slight increase in pressure. In the present application, however, I shall not specifically refer to the apparatus used for this purpose.

Other means of separating the liquid from the solidifying agent are filtration and the drawing of air or other gas through the plastic mass.

What I claim as my invention is,—

1. The process of solidifying fluids comprising the addition thereto of a relatively small percentage of albumen.

2. The process of solidifying fluids comprising the dissolving of the albumen in a solvent and the addition thereto of the fluid to be solidified.

3. The process of solidifying fluids comprising the forming of a dilute aqueous solution of albumen and the addition thereto of the fluid to be solidified.

4. The process of solidifying fluids comprising the forming of a dilute aqueous solution of albumen, adding to said solution an anti-coagulating substance, then adding the fluid to be solidified and then adding a coagulating material to produce a jelly-like substance.

5. As a new product, an inflammable fluid solidified with albumen.

6. As a new product, an inflammable hydrocarbon oil solidified with albumen.

In testimony whereof I affix my signature.

MARSHALL H. KEYT.